United States Patent [19] [11] 3,908,263
Matarese [45] Sept. 30, 1975

[54] SEPARATE INTERDIGITAL ELECTRODES WITHOUT USING ANY SPECIAL PHOTOLITHOGRAPHIC TECHNIQUES

[75] Inventor: Ralph Jerome Matarese, Hightstown, N.J.

[73] Assignee: RCA Corporation, New York, N.Y.

[22] Filed: Nov. 14, 1974

[21] Appl. No.: 523,757

[52] U.S. Cl. ................ 29/592; 29/25.17; 29/25.18; 29/625; 427/250
[51] Int. Cl.$^2$ .......................................... H05K 3/16
[58] Field of Search ....... 29/592, 625, 25.17, 25.18; 156/4, 7, 8, 17, 3, 6, 11; 118/48; 117/201, 212, 213, 215, 217, 223, 225, 227, 229, 37 R, 117/47 R, 66, 107, 119

[56] References Cited

UNITED STATES PATENTS

| | | | |
|---|---|---|---|
| 3,046,839 | 7/1962 | Bird et al. | 117/45 X |
| 3,218,496 | 11/1965 | Jensen et al. | 117/217 UX |
| 3,391,022 | 7/1968 | Saito | 117/215 |

*Primary Examiner*—Milton S. Mehr
*Assistant Examiner*—Joseph A. Walkowski
*Attorney, Agent, or Firm*—Glenn H. Bruestle; Carl L. Silverman

[57] ABSTRACT

A plurality of substantially parallel, spaced, raised strips are provided on a surface of a substrate. The strips are disposed in such a manner wherein interdigitated electrodes are formed through one evaporation step of a metal from a predetermined angle.

10 Claims, 9 Drawing Figures

SEPARATE INTERDIGITAL ELECTRODES WITHOUT USING ANY SPECIAL PHOTOLITHOGRAPHIC TECHNIQUES

BACKGROUND OF THE INVENTION

This invention relates to a method of forming interdigitated electrodes, and particularly to such a method wherein the interdigitated electrodes are formed through one metal evaporation step.

Interdigitated electrodes having micron and submicron electrode separations are often desired for charge coupled devices. Interdigitated electrodes have heretofore been formed by several methods. One method presently employed for forming the interdigitated electrodes includes using standard photolithographic techniques to form a pattern to define the electrodes. The electrodes are then formed and appropriate ones are electrically connected through the use of photolithographic techniques. Another method employs a scanning electron beam exposure to form the patterns so as to be capable of forming submicron electrodes and submicron electrode separations. The latter method suffers from the fact that it is extremely difficult to align the second scanning electron beam exposure pattern (for connecting the electrodes) with the previously produced scanning electron exposure pattern. Furthermore, both methods form the interdigitated electrodes in a process which includes the two basic steps of forming the electrodes and then electrically connecting the electrodes. It would therefore be desirable to develop a method whereby interdigitated electrodes can be simply and quickly formed.

SUMMARY OF THE INVENTION

In a method of forming interdigitated electrodes, a plurality of substantially parallel, spaced, raised strips are formed on a surface of a substrate. The strips are disposed such that at one end of the strips the end portions of one set of alternate strips project beyond the end portions of the remaining set of alternate strips. At the other end of the strips, the end portions of the remaining set of alternate strips project beyond the end portions of the one set of alternate strips. Each one of the strips has a surface spaced from the surface of the substrate with a portion of the strip surface spaced a greater distance from the substrate surface than the remaining portion of the strip surface.

A flow of metal vapors is created from a source which is spaced from the substrate surface. The flow of vapors extends along planes which are at an angle less than 90° with respect to the substrate surface.

The metal vapors are then deposited on the strip surfaces and the substrate surface so as to form a plurality of metal film electrodes on the strip surfaces with the electrodes on the one set of alternate strips being connected by a metal film on the substrate surface at one end of the strips. The electrodes on the remaining set of alternate strips are connected by a metal film on the substrate surface at the other end of the strips.

DETAILED DESCRIPTION

Figure 1:
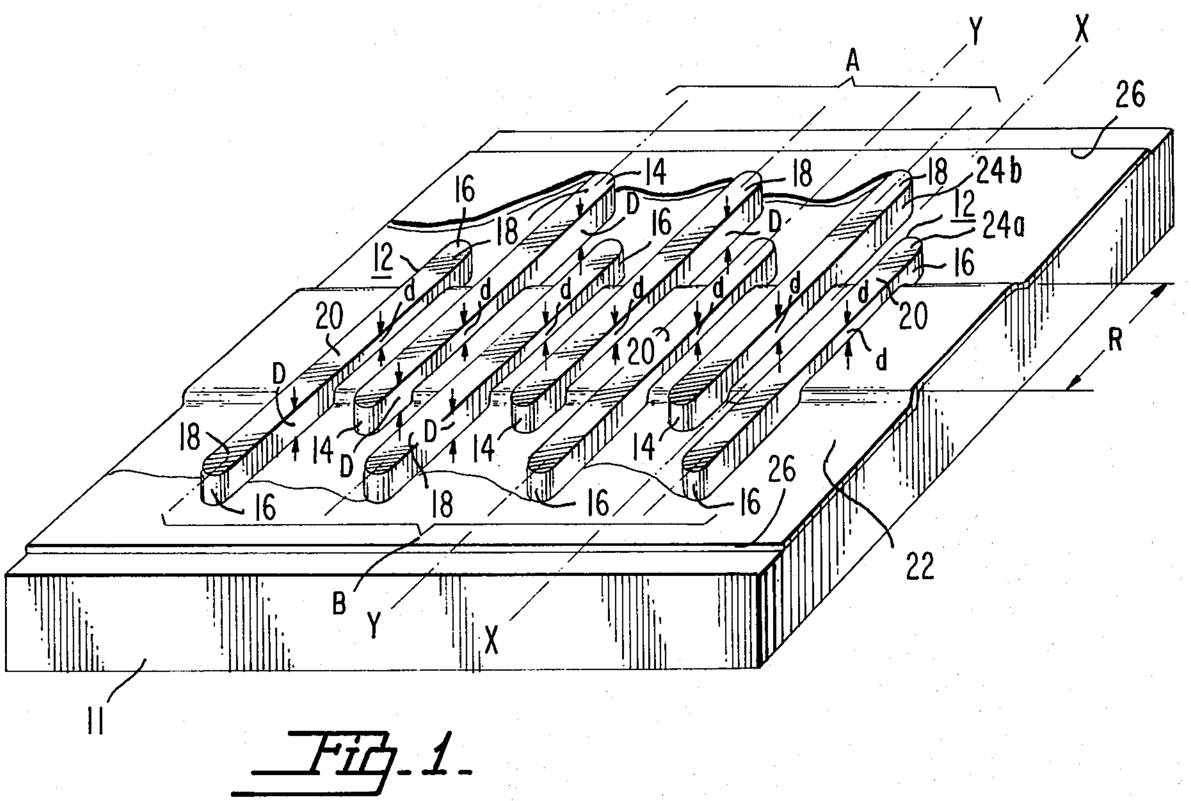
FIG. 1 is a perspective view of one form of a device having interdigitated electrodes made through the method of the present invention.

Referring initially to FIG. 1, one form of a device having interdigitated electrodes made through the method of the present invention is generally designated as 10. The device 10 includes a substrate 11 of any desired material, e.g., n type gallium arsenide on insulating gallium arsenide, and includes a plurality of substantially parallel, spaced, raised strips 12 on a surface of the substrate. The strips 12 are disposed such that at one end of the strips the end portions 14 of one set (A) of alternate strips project beyond the end portions 16 of the remaining set (B) of alternate strips. At the other end of the strips the end portions 16 of the remaining set (B) of alternate strips project beyond the end portions 14 of the one set (A) of alternate strips. Each one of the strips 12 has a surface spaced from the surface of the substrate 11 with a portion 18 of the strip surface spaced a greater distance from the substrate surface than the remaining portion 20 of the strip surface. Within an area R on the surface of the substrate 11, all of the strips 12 are of substantially the same thickness d, as shown in FIG. 1. The end portions 14 and 16 of the strips 12 which extend beyond the area R are of a thickness D which is greater than the thickness d of the portion of the strip 12 which extends through the area R.

Figure 2:
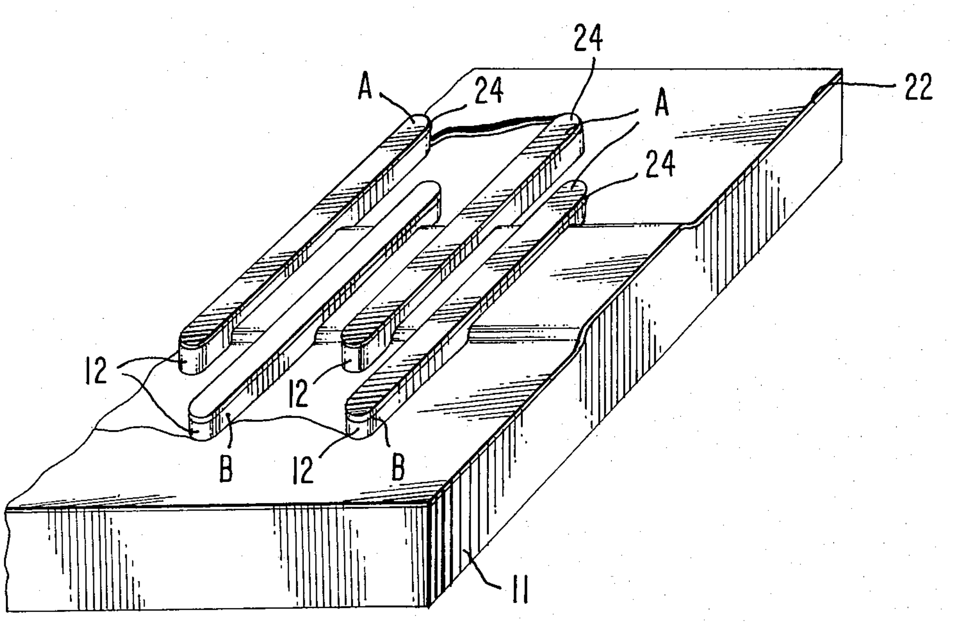
FIG. 2 is a perspective view showing a portion of the device of FIG. 1 in greater detail.

A conductive metal film 22 is on the strips 12 and the substrate surface. As can be more clearly seen in FIG. 2, the conductive film 22 forms a plurality of metal film electrodes 24 on the strips 12. In addition, as can be seen in FIGS. 1 and 2, the electrodes 24 on the one set (A) of alternate strips are connected by the metal film 22 on the substrate surface at one end of the strips 12. The electrodes 24 on the remaining set (B) of alternate strips are connected by the metal film 22 on the substrate surface at the other end of the strips 12. Although the conductive film 22 connects electrodes 24 on both sets (A) and (B), respectively, of the alternate ones of the strips 12, it is often preferable to include or define a connecting pad 26 on the substrate surface, as in FIG. 1, whereby external electrical connections can be more easily made.

Figure 3:
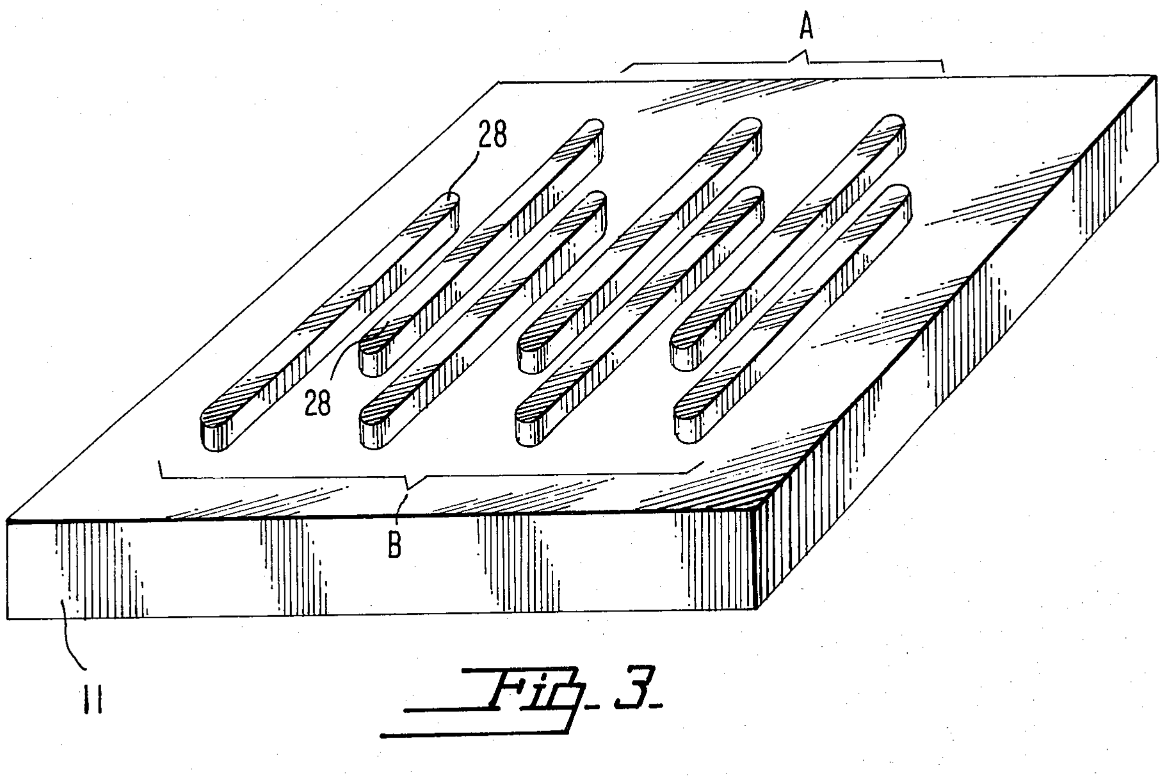
FIGS. 3, 4, 5 and 6 are perspective views showing the steps of fabricating the device of FIG. 1 through one form of the method of the present invention.

To carry out the method of the present invention, a film of a masking material, such as silicon dioxide, is deposited on a surface of a substrate 11, of a material, such as n-type gallium arsenide on insulating gallium arsenide, e.g., depositing approximately 6000A of silicon dioxide through any conventional means. Well known photolithographic techniques can then be employed to form a plurality of coplanar parallel masking strips 28 in the film as shown in FIG. 3. The masking strips 28 are utilized for forming the strips 12 of FIG. 1 which will serve as the base for the electrodes 24. For example, masking strips 28 which are 7$\mu$m wide with 5$\mu$m spacing can be formed on the substrate 11 using a suitable mask and a silicon dioxide etchant such as buffered hydrofluoric acid, which is commercially available as Buffer HF from Transene Co., Inc. The masking strips 28 are formed such that at one end of the masking strips 28 the end portions of one set (A) of alternate masking strips project beyond the end portions of the remaining set (B) of alternate masking strips. At the other end of the masking strips 28 the end portions of the remaining set (B) of alternate masking strips project beyond the end portion of the one set (A) of alternate strips. For example, the end portions of one set of alternate masking strips (A) may extend 17$\mu$m beyond the end portions of the remaining set (B) of alternate masking strips.

The surface of the substrate 11 is then etched down approximately 2400A with a suitable gallium arsenide etchant, such as one which comprises 17 parts ammonium hydroxide, 7 parts hydrogen peroxide and 76 parts distilled water. After the etching of the substrate 11, each strip will include an upper region 28 of silicon dioxide and a lower region 30 of n-type gallium arsenide, as in the strips 32 of FIG. 4. Each strip 32 has a lower region 30 having substantially the same thickness d along its length. Although for this application, the etchant has been chosen to etch in a sloping fashion, other etchants can be utilized if desired.

Figure 4:
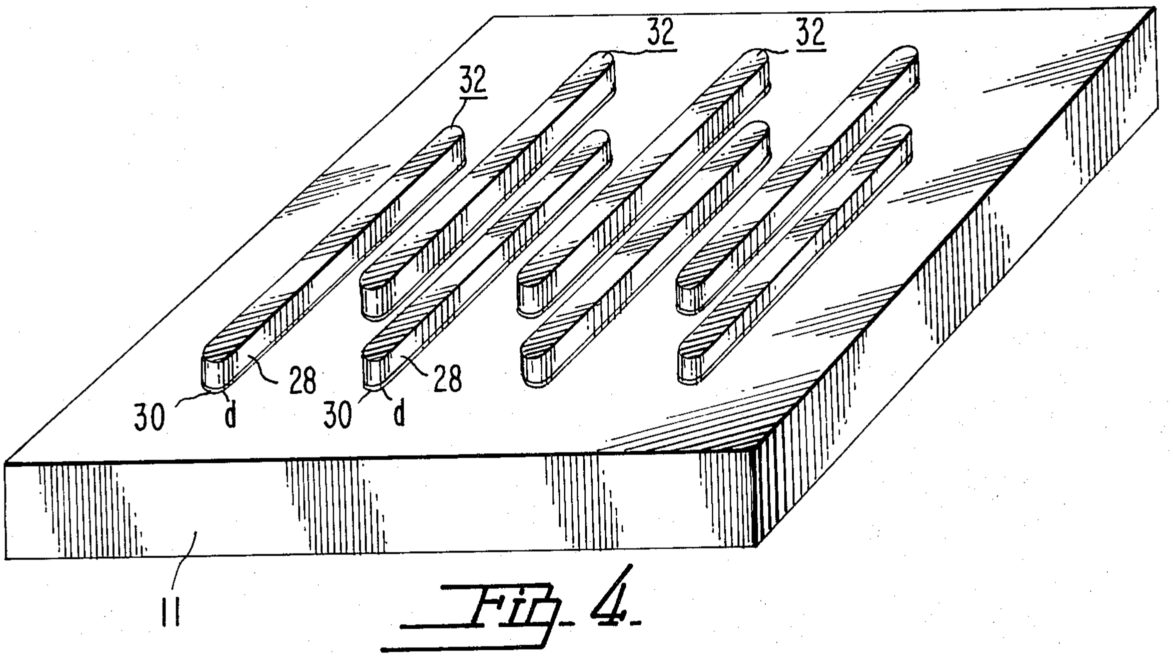
Figure 5:
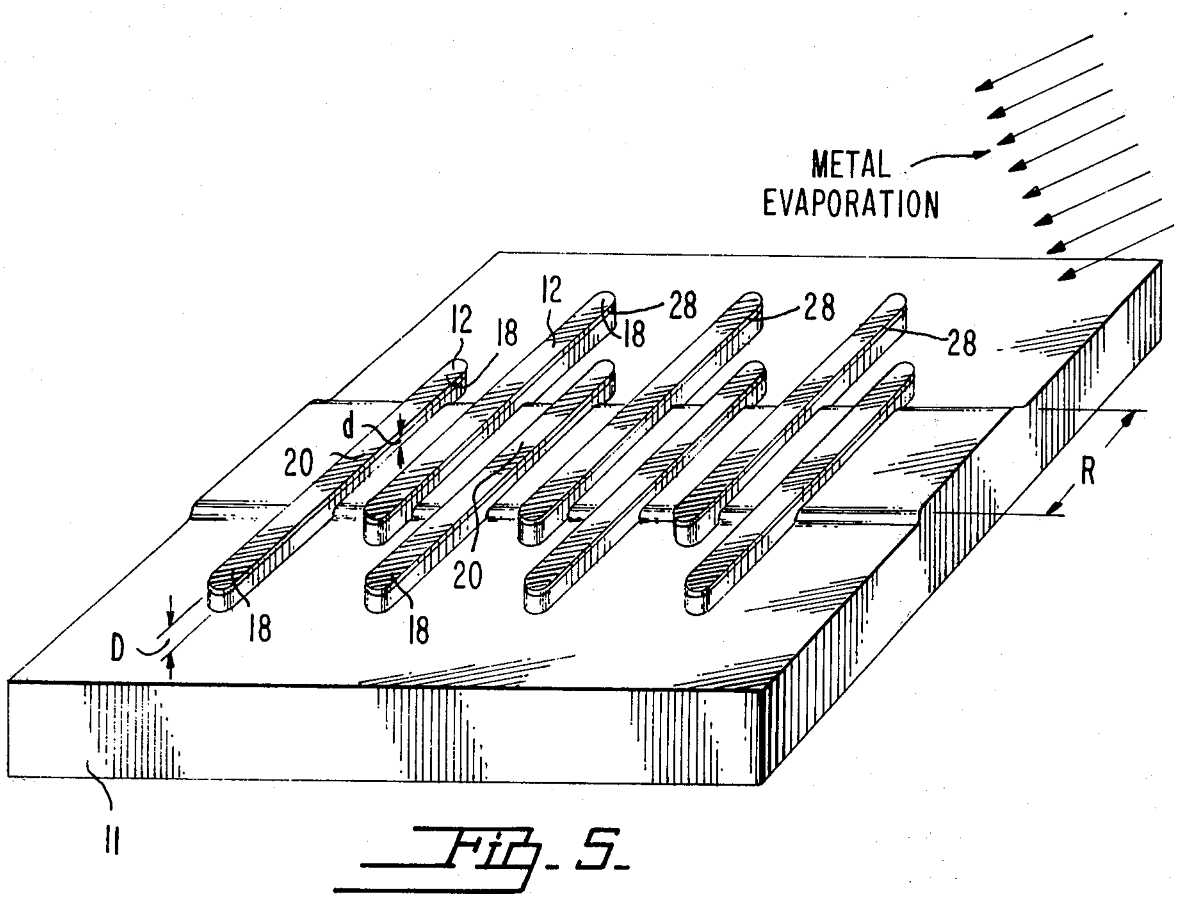

Next, the thickness along the length of the lower regions 30 of each one of the remaining strips 32 of FIG. 4 is then varied so as to form strips 12 in which each one of the strips 12 has a surface spaced from the surface of the substrate with a portion 18 of the strip surface spaced a greater distance from the substrate surface than the remaining portion 20 of the strip surface, as in FIG. 5. This can be accomplished by maintaining the thickness $d$ of the lower region of the strips 32 of FIG. 4 in an area R while increasing the thickness of the portion of the strip extending beyond the area R to a thickness D, with $D>d$.

The thickness of the strip 12 extending beyond the area R can be increased by removing portions of the substrate 11 of FIG. 4 between the portions of the strip 30 to be thickened through any conventional method. For example, the area R can be protected by a photoresist, such as the one commercially available as AZ-1350 from Shipley Co., Inc., while the portion of the substrate 11 to be removed is treated with a suitable gallium aresenide etchant, such as the one mentioned previously. It should be noted that the masking strips 28 function to protect the strip surfaces from harm by the etchant. Etching, e.g., approximately 1.3 microns, into the substrate 11 between the portions of the strip 30 to be thickened, forms the strips 12 of the FIG. 5 with each strip having a surface spaced from the surface of the substrate with a portion 18 of the strip surface spaced a greater distance from the substrate surface than the remaining portion 20 of the strip surface, as in FIG. 1. Next, the masking strips 28 are removed, e.g., using the previously mentioned silicon dioxide etchant and the photoresist is removed, e.g., treated with acetone.

Figure 6:
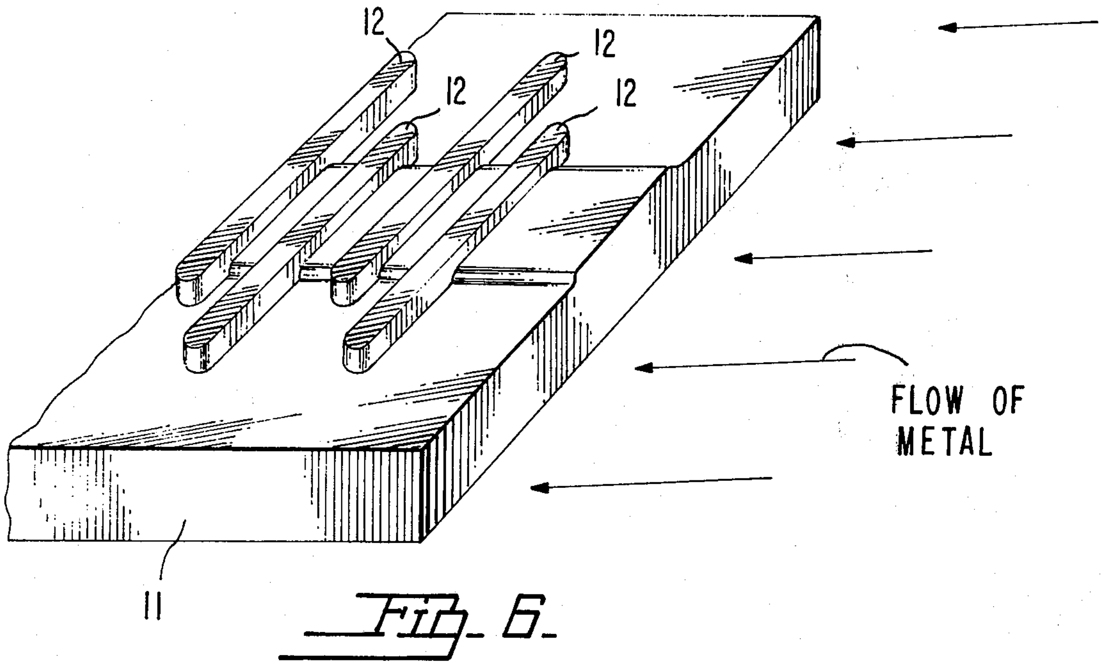

Next, the method of the present invention includes forming interdigitated electrodes, as in FIG. 1, through one metal evaporation step. The structure shown in FIG. 5 is placed in a conventional evaporation unit. The particular spacing and thicknesses D and $d$ of the strips 12 of FIG. 5 determine a particular range of angles wherein one metal evaporation step will form interdigitated electrodes 24 as in FIG. 1. A flow of metal vapors is created from a source (not shown) which is spaced from the substrate. The flow of vapors extends along planes which are at an angle less than 90° with respect to the substrate surface. It is preferable for the flow of vapors established to extend along planes which are parallel to the strips 12 as in FIG. 6. Then, the method includes depositing the metal vapors on the strip surfaces and substrate surface so as to form a plurality of metal film electrodes on the substrate surface with the electrodes on one set of alternate strips being connected by a metal film on the substrate surface at one end of the strips and with the electrodes on the remaining set of alternate strips being connected by a metal film on the substrate surface at the other end of the strips.

Figure 7:
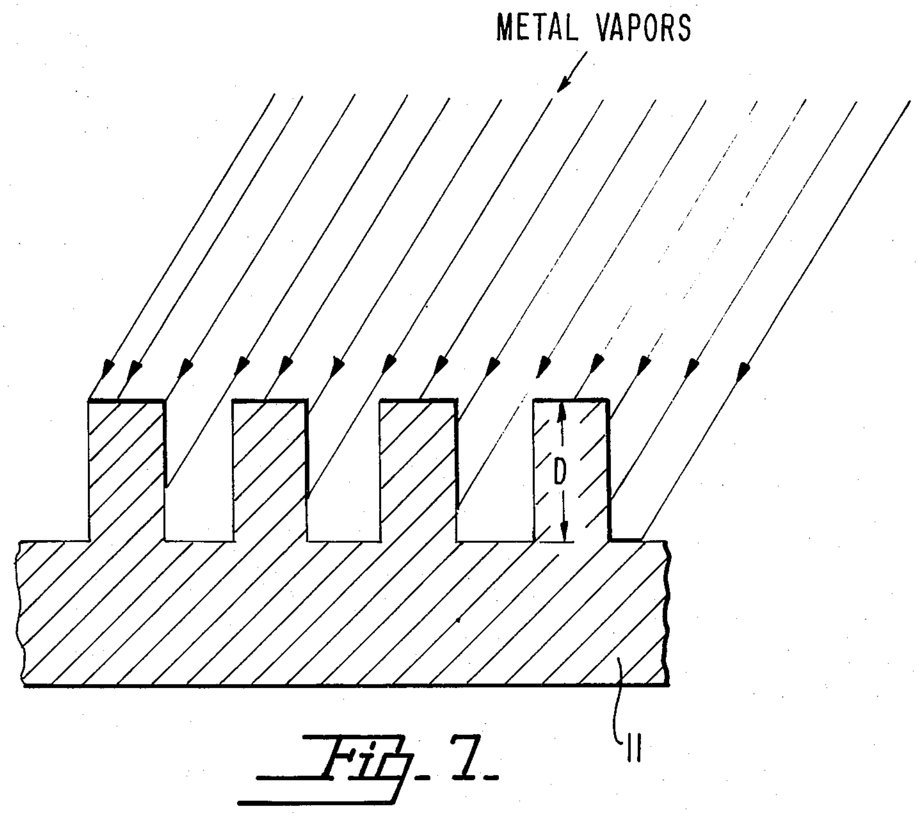
FIG. 7 is a cross-sectional view of a portion of the device of FIG. 1 showing the shadowing mechanism which is utilized in the metal evaporation step.

The greater thickness D of the strip 12 creates a larger shadow than the smaller thickness d of the strip 12, so that a careful choice of D, $d$, and strip spacing will allow one to form interdigitated electrodes with one step of metal evaporation. For example, FIG. 7 illustrates the shadowing mechanism which occurs at the end portions 14 and 16 of the strips 12, due to the thickness D, by which the interdigitated electrodes 24, as in FIG. 1, are formed in one metal evaporation step. Although the shadowing due to the thickness d is not shown, it is apparent that the same mechanism applies. Through the use of well-known trigonometric relations, the desired angle of evaporation can be found for a particular application. For example, with a thickness D of approximately 2.1$\mu$m, a thickness d of approximately 0.8$\mu$m, a spacing of approximately 5$\mu$m, and a metal evaporation of approximately 75° from the normal, interdigitated electrodes 24, as in FIG. 1, can be formed in one metal evaporation step wherein the electrodes are separated by approximately 1$\mu$m. By appropriate choice of the parameters, it is apparent that the method of the present invention is also applicable to forming interdigitated electrodes having submicron electrode separation.

Figure 8:
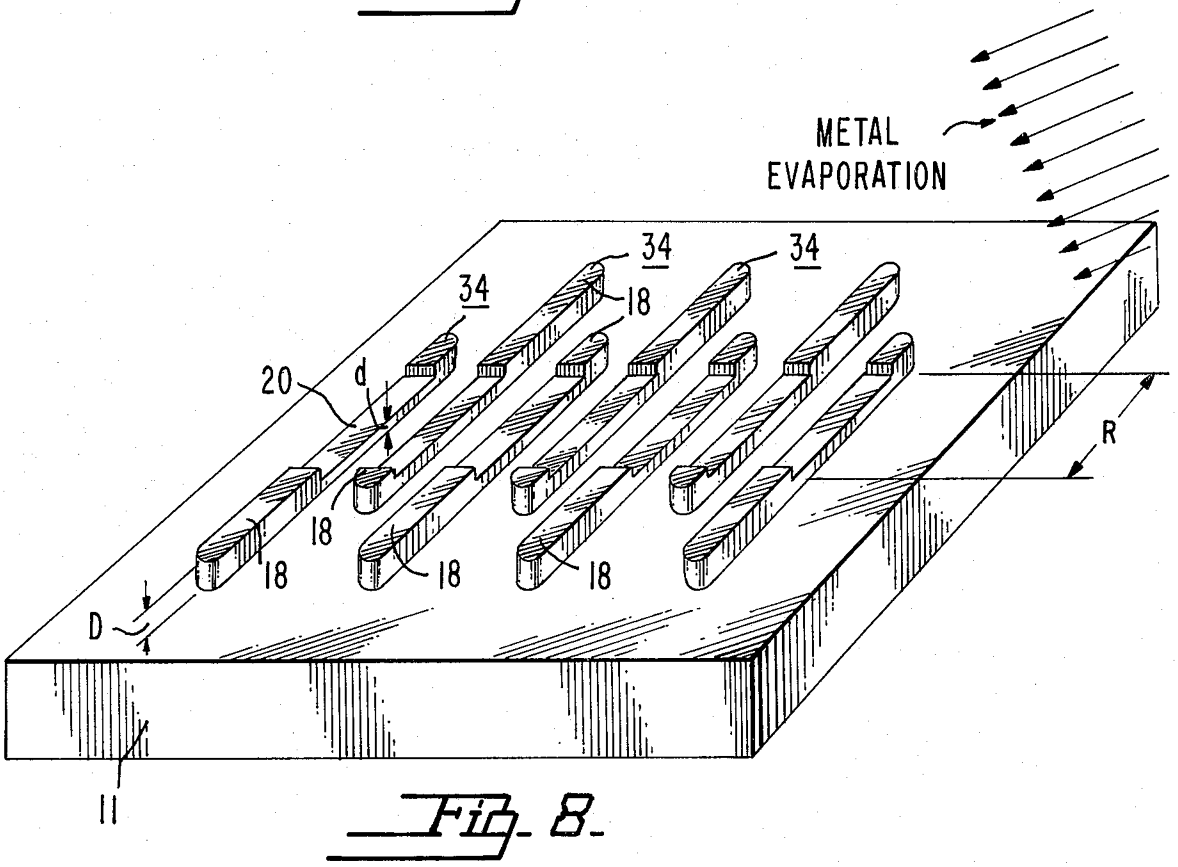
FIG. 8 is a perspective view showing the steps of fabricating another form of a device having interdigitated electrodes made through another form of the method of the present invention.

Although the method of the present invention has been shown with the strips 12 having end portions 14 and 16 with an increased thickness D provided by etching deeper into the substrate 11, as in FIG. 5, the method is also successful when the end portions of the strips 30 are thickened to a thickness D by depositing additional material thereon, as in FIG. 8. For example, an area R can be masked with photoresist as before and then additional n-type gallium arsenide can be deposited, as is well known in the art, on the end portions of the strips 30 of FIG. 4 so as to form the strips 34 of FIG. 8. The method as shown in FIG. 8 would be particularly applicable for forming a silicon dioxide charge coupled device wherein the end portions 14 and 16 of the strips 30 are thickened by depositing additional silicon dioxide as is well known in the art.

In reference to FIG. 1, it can be seen that the two sets (A and B) of the interdigitated electrodes formed through the method of the present invention are not totally electrically isolated from each other, e.g., electrodes 24$a$ and 24$b$ are connected by the metal film 22. However, the structure of FIG. 1 can be easily modified to form two sets of interdigitated electrodes which are totally electrically isolated from each other. For example, although FIG. 1 shows a structure having only 7 of the interdigitated electrodes 24, it is important to remember that the method of the present invention is applicable to forming interdigitated electrodes of such size and spacing so as to form tens of thousands of interdigitated electrodes on a substrate. In such cases, electrically isolated, interdigitated electrodes can be easily obtained by modifying the substrate so that one set of the alternate strips are electrically connected to each other and the remaining set of the alternate strips are electrically connected to each other, with the one set being electrically isolated from the other set.

For example, by cutting along the line X—X of FIG. 1 by any conventional means, the electrical connection between the electrodes 24*a* and 24*b* can be broken so as to form interdigitated electrodes with one set isolated from the other set. Actually, since FIG. 1 only shows several electrodes 24, the structure could be modified by cutting along any line which disposes of the electrical connection between fingers 24*a* and 24*b*, e.g., along the line Y—Y of FIG. 1. If desired, the electrical connection between the electrodes 24*a* and 24*b* can also be removed by utilizing standard photolithographic techniques, e.g., the same standard mask can be used both to form the connecting pads 26 and to remove the electrical connection between the electrodes 24*a* and 24*b*.

Figure 9:
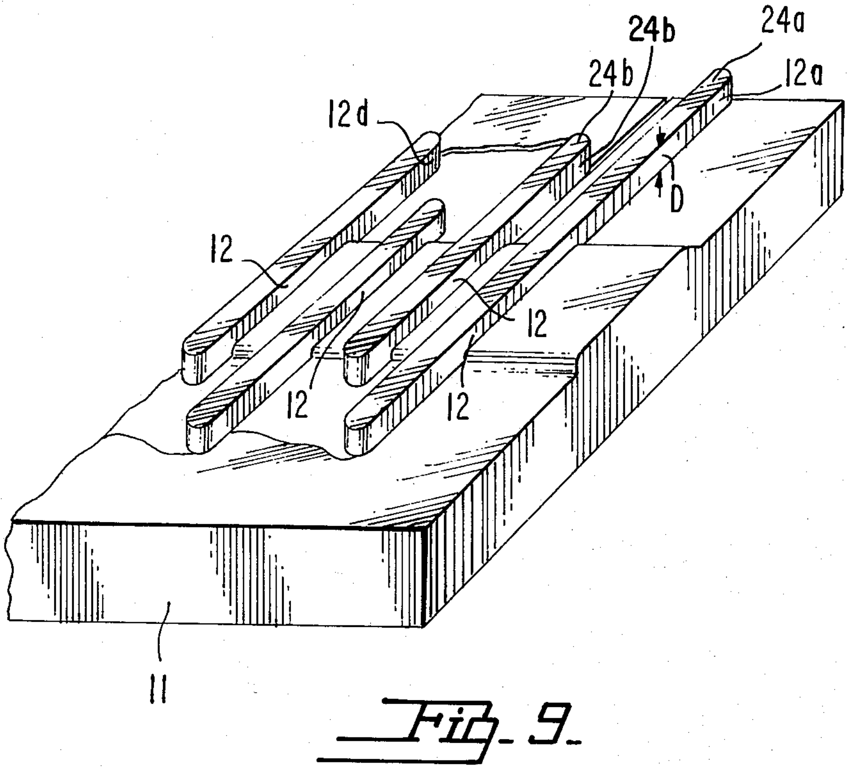
FIG. 9 is a perspective view showing the steps of fabricating the device of FIG. 1 through still another form of the method of the present invention.

Another form of the method of the present invention is shown in FIG. 9 wherein the step of one metal evaporation both metallizes and connects appropriate strips so as to form the interdigitated electrodes which are electrically isolated without any further processing as required previously. As can be observed from FIG. 9, where the relevant portion of the substrate 11 is illustrated, the substantially parallel spaced raised strips 12 are provided on the surface of the substrate 11 as before but are disposed in such a manner that when the metal is evaporated from the predetermined angle, the interdigitated electrodes are formed without the need for any further processing. Specifically, at least one of the strips 12 is formed having a greater length than the lengths of the remaining strips.

For example, as in FIG. 9, one end of the strip 12*a* is extended to an edge of the substrate 11 and is of the thickness D through its extended distance. The strip 12*a*, when metallized, effectively prevents an electrical connection from occurring between the metallized strips, e.g., the two adjacent strips nearest the source of metal vapor, 24*a* and 24*b*, as occurred in FIG. 1. Thus, this form of the method of the present invention forms interdigitated electrodes through one metal evaporation step without the need for any further processing. It should be noted that the above technique is not limited to use only for the two adjacent strips nearest the source of metal vapor which would otherwise be electrically connected to each other as in FIG. 1, but also for use in any situation where it may be necessary to insure that two adjacent strips are electrically insulated from each other. For example, the last strip 12*d* of FIG. 9 could be extended (not shown) as shown for the strip 12*a*.

Furthermore, although the method of the present invention has been illustrated using a substrate of n type gallium arsenide on insulating gallium arsenide and a substrate of silicon dioxide on insulating gallium arsenide, the method of the present invention is applicable to any material or materials as long as strips having the required surface and spacing relations are formed. In addition, although the method of the present invention has been described with the use of strips having a pair of thickened end portions, it is readily apparent that the method is also successful when only one end portion of each strip is thickened as long as the thickened end portion can provide a shadow large enough so as to prevent the metal evaporation step from electrically connecting adjacent strips. Thus, the method of the present invention provides a means whereby interdigitated electrodes can be simply and quickly formed.

I claim:

1. In a method of forming interdigitated electrodes comprising the steps of:

a. forming a plurality of substantially parallel, spaced, raised strips on a surface of a substrate with said strips disposed such that at one end of said strips the end portions of one set of alternate strips project beyond the end portions of the remaining set of alternate strips while at the other end of said strips the end portions of said remaining set of alternate strips project beyond the end portions of said one set of alternate strips, each one of said strips having a surface spaced from said surface of the substrate with a portion of the strip surface being spaced a greater distance from said substrate surface than the remaining portion of the strip surface, b. creating a flow of metal vapors from a source which is spaced from said substrate surface with the flow of vapors extending along planes which are at an angle less than 90° with respect to said substrate surface, and c. depositing said metal vapors on said strip surfaces and substrate surface so as to form through shadow effect deposition a plurality of metal film electrodes on said strip surfaces with the electrodes on the one set of alternate strips being connected by a metal film on the substrate surface at the one end of the strips and the electrodes on the remaining set of alternate strips being connected by a metal film on the substrate surface at the other end of the strips.

2. A method in accordance with claim 1 in which the flow of vapors extends along planes which are parallel to said strips.

3. A method in accordance with claim 2 in which the step of forming said strips includes forming said strips such that the end surfaces of the one set of alternate strips are respectively coplanar and the end surfaces of the remaining set of alternate strips are also respectively coplanar.

4. A method in accordance with claim 2 in which the step of forming said strips includes forming said strips such that said portion of said strip surface is disposed on opposite ends of said remaining portion of the strip surface.

5. A method in accordance with claim 4 in which the step of forming said strips includes forming said strips with at least one of said strips having a greater length than the lengths of the remaining strips such that when the metal vapors are deposited all of the metal film electrodes on the one set of alternate strips and all of the metal film electrodes on the remaining set of alternate strips are respectively connected by the metal film.

6. A method in accordance with claim 4 in which the step of forming said strips comprises:

forming a plurality of substantially parallel, spaced, raised strips on the surface of the substrate with said strips of the same thickness along their lengths, and then increasing the thickness of each one of said strips along portions thereof so as to form said surface of said strips.

7. A method in accordance with claim 6 in which the step of forming said strips of the same thickness comprises:

forming a plurality of masking strips on said substrate, and then removing portions of said substrate extending between said masking strips.

8. A method in accordance with claim 7 in which the step of forming said surface of each one of said strips comprises removing additional portions of said substrate extending between said strips of the same thickness.

9. A method in accordance with claim 8 in which said portions of said substrate are removed through etching.

10. A method in accordance with claim 7 in which the step of forming said surface of each one of said strips comprises applying additional material onto said strips of the same thickness.

* * * * *